(12) United States Patent
Woronow et al.

(10) Patent No.: US 7,743,006 B2
(45) Date of Patent: Jun. 22, 2010

(54) BAYESIAN NETWORK TRIADS FOR GEOLOGIC AND GEOPHYSICAL APPLICATIONS

(75) Inventors: Alex Woronow, Pearland, TX (US); Karen M. Love, Pearland, TX (US)

(73) Assignee: ExxonMobil Upstream Research Co., Houston, TX (US)

( * ) Notice: Subject to any disclaimer, the term of this patent is extended or adjusted under 35 U.S.C. 154(b) by 358 days.

(21) Appl. No.: 11/631,666

(22) PCT Filed: May 31, 2005

(86) PCT No.: PCT/US2005/018978

§ 371 (c)(1),
(2), (4) Date: Jan. 5, 2007

(87) PCT Pub. No.: WO2006/112864

PCT Pub. Date: Oct. 26, 2006

(65) Prior Publication Data

US 2007/0226158 A1    Sep. 27, 2007

Related U.S. Application Data

(60) Provisional application No. 60/586,027, filed on Jul. 7, 2004.

(51) Int. Cl.
*G06N 5/00* (2006.01)
(52) U.S. Cl. .................................. 706/17; 706/45
(58) Field of Classification Search ............ 706/52, 706/14, 12, 17, 45; 707/101
See application file for complete search history.

(56) References Cited

U.S. PATENT DOCUMENTS

| 4,279,307 A | 7/1981 | Jones |
| 4,646,240 A | 2/1987 | Serra et al. |
| 4,991,095 A | 2/1991 | Swanson |
| 5,126,939 A | 6/1992 | Carpentier et al. |
| 5,416,750 A | 5/1995 | Doyen et al. |
| 5,444,619 A | 8/1995 | Hoskins et al. |

(Continued)

FOREIGN PATENT DOCUMENTS

WO    WO 2005/052639    6/2005

(Continued)

OTHER PUBLICATIONS

MRAG Americas, Inc., et al., Pacific Coast Groundfish EFH: Analytical Framework, Version 3, Prepared for Pacific States Marine Fisheries Commission, Nov. 4, 2003, pp. 1-71.*

(Continued)

*Primary Examiner*—Wilbert L Starks, Jr.

(57) ABSTRACT

A method and apparatus are disclosed for modeling a system to estimate values and associated uncertainties for a first set of variables describing the system. A second set of system variables is selected, where the second set is directly or indirectly causally related to the first set of variables. Data is obtained or estimated for each variable in the second set and the quality of selected data is appraised. A network is formed with nodes including both sets of variables and the quality appraisals, having directional links connecting interdependent nodes, the directional links honoring known causality relationships. A Bayesian Network algorithm is used with the data and quality information to solve the network for the first set of variables and their associated uncertainties.

31 Claims, 15 Drawing Sheets

U.S. PATENT DOCUMENTS

| | | | |
|---|---|---|---|
| 5,493,539 A | 2/1996 | Haley et al. | |
| 5,539,704 A | 7/1996 | Doyen et al. | |
| 5,612,928 A | 3/1997 | Haley et al. | |
| 5,764,515 A | 6/1998 | Guerillot et al. | |
| 5,835,883 A | 11/1998 | Neff et al. | |
| 5,838,634 A | 11/1998 | Jones et al. | 367/73 |
| 5,884,799 A | 3/1999 | Korber et al. | |
| 5,952,569 A | 9/1999 | Jervis et al. | |
| 5,953,680 A | 9/1999 | Divies et al. | |
| 5,955,966 A | 9/1999 | Jeffryes et al. | |
| 6,011,557 A | 1/2000 | Keskes | |
| 6,205,402 B1 | 3/2001 | Lazaar et al. | |
| 6,212,502 B1 | 4/2001 | Ball et al. | 704/270 |
| 6,246,963 B1 | 6/2001 | Cross et al. | |
| 6,331,964 B1 | 12/2001 | Barone | |
| 6,408,290 B1 * | 6/2002 | Thiesson et al. | 706/52 |
| 6,442,487 B2 | 8/2002 | Kim | |
| 6,529,891 B1 * | 3/2003 | Heckerman | 706/52 |
| 6,549,854 B1 | 4/2003 | Malinverno et al. | 702/16 |
| 6,571,619 B2 | 6/2003 | Herron et al. | |
| 6,591,146 B1 | 7/2003 | Pavlovic et al. | 700/29 |
| 6,597,995 B1 | 7/2003 | Cornu et al. | |
| 6,603,313 B1 | 8/2003 | Srnka | 324/354 |
| 6,614,716 B2 | 9/2003 | Plona et al. | |
| 6,615,139 B1 | 9/2003 | Chakravarthi | |
| 6,625,541 B1 | 9/2003 | Shenoy et al. | |
| 6,646,437 B1 | 11/2003 | Chitale et al. | |
| 6,654,692 B1 | 11/2003 | Neff | |
| 6,662,147 B1 | 12/2003 | Fournier et al. | 703/10 |
| 6,721,661 B2 | 4/2004 | Anstey | |
| 6,754,588 B2 | 6/2004 | Cross et al. | |
| 6,766,255 B2 | 7/2004 | Stone | |
| 6,771,800 B2 | 8/2004 | Keskes et al. | |
| 6,826,486 B1 | 11/2004 | Malinverno | |
| 6,844,729 B2 | 1/2005 | Herron et al. | |
| 6,970,808 B2 | 11/2005 | Abhulimen et al. | |
| 7,003,439 B2 | 2/2006 | Aldred et al. | |
| 7,043,367 B2 | 5/2006 | Granjeon | |
| 7,044,238 B2 * | 5/2006 | Hutchinson | 175/50 |
| 7,062,072 B2 | 6/2006 | Anxionnaz et al. | |
| 7,091,719 B2 | 8/2006 | Freedman | |
| 7,117,091 B2 | 10/2006 | Masson et al. | |
| 7,128,167 B2 | 10/2006 | Dunlop et al. | |
| 7,177,764 B2 | 2/2007 | Stone | |
| 7,181,380 B2 | 2/2007 | Dusterhoft, et al. | |
| 7,306,054 B2 * | 12/2007 | Hutchinson | 175/45 |
| 7,309,983 B2 | 12/2007 | Freedman | |
| 7,337,069 B2 | 2/2008 | Masson et al. | |
| 7,433,851 B2 | 10/2008 | Mirowski | |
| 2003/0065535 A1 * | 4/2003 | Karlov et al. | 705/2 |
| 2004/0122640 A1 | 6/2004 | Dusterhoft | |
| 2005/0216496 A1 * | 9/2005 | Chickering | 707/101 |
| 2008/0288172 A1 | 11/2008 | Stone | |
| 2009/0012746 A1 | 1/2009 | Kairo et al. | |

FOREIGN PATENT DOCUMENTS

| | | |
|---|---|---|
| WO | WO 2005/066660 | 7/2005 |
| WO | WO 2006/112864 | 10/2006 |

OTHER PUBLICATIONS

Stassopoulou, A., et al., Application of a Bayesian Network in a GIS Based Decision Making System, International Journal of Geographical Information Science, vol. 12, No. 1, Jan. 1, 1998, pp. 23-46.*

Coopersmith, E. M. et al. (2002) "A Practical Approach to Evaluating the Value of Information and Real Option Decisions in the Upstream Petroleum Industry," *Society of Petroleum Engineers*, SPE Paper 77582, 10 pgs.

Pendock, N. E. et al. (2002) "Choosing Geologic Models With Bayesian [sic] Belief Networks," *S. African Journal of Sci.*, 98, pp. 500-502.

Reid, C. A. et al. (1985) "A Knowledge Representation for Reasoning about Petroleum Geology," *2nd IEEE Computer Soc. Artif. Intel. Appl. Conf.*, Miami Beach, Fl. pp. 125-129.

Rudolph, K.W. (2001) "DHI/AVO Analysis Best Practices: A Worldwide Analysis," *AAPG Distinguished Lecture*, 20 pgs.

Smyth, P. (1997) "Belief Networks, Hidden Markov Models, and Markov Random Fields: A Unifying View," *Pattern Recognition Letters*, 18, pp. 1261-1268.

Spiegelhalter, D. J. et al. (1993) "Bayesian Analysis in Expert Systems," *Statistical Sci.*, 8, pp. 219-283.

Veezhinathan, J. (1992) "Uncertainty Handling Using Belief Networks and Their Applications to Petroleum Industry," *Proc. Arti Artif. Intel. in Petrol. Exploration & Production Conf.*, Houston, TX.

Xiang, Y. et al. (2000) "A Constructive Bayesian Approach for Vehicle Monitoring," *Thesis*, pp. 14-21.

EP Standard Search Report No. RS111732US, dated Dec. 27, 2004, 2 pages.

Veezhinanthan, J. (1992) "Uncertainty Handling Using Belief Networks and Their Applications to Petroleum Industry," *Proc. Artif. Intel. In Petro. Exploration & Production Conf.* Houston, TX, pp. 9-24.

PCT International Search Report & Written Opinion (2006) 6 pages.

Hargrave, M. M. (2003) "Prediction and Productivity Improvement in Quantitative Interpretation via Rock Physics Modeling and Interpreted Led Automation," *First Break*, vol. 21, Sep. 2003.

"An Oil Drilling Problem," Bayesian Models CSE458 Exercise 2, Computer Science Semester I, 2003, School of Computer Science and Software Engineering, Monash University.

Eidsvik, et al. (2002), "Seismic Reservoir Prediction using Bayesian Integration of Rock Physics and Markov Random Fields: A North Sea Example." Leading Edge, 21, 290-94.

Eidsvik, et al. (2004), "Stochastic Reservoir Characterization Using Prestack Seismic Data," Geophysics, v. 69 No. 4, pp. 978-993.

Folk, R.L. (1968), "Petrology of Sedimentary Rocks," Austin, Texas, Hemphill Publishing Co., pp. 110-119.

Johnsson, M.J. et al. (1993) "The System Controlling the Composition of Clastic Sediments," (eds), Processes Controlling the Composition of Clastic Sediments: Geological Society of America Special Paper 284, pp. 1-19.

Krynine, Paul D. (1943), "Diastrophism and the Evolution of Sedimentary Rocks," Pennsylvania State College Mineral Industries, Technical Paper No. 84-a, 21 pages.

Potter, P.E. et al. (1956) "Sources of Basal Pennsylvanian Sediments in the Eastern Interior Basin Part 3, Some Methodological Implications," Journal of Geology, v. 64, pp. 447-455.

Potter, P.E. et al. (1978) "Petrology and Chemistry of Modern Big River Sands," Journal of Geology v. 86, pp. 423-449.

Rostirolla, S.P. et al. (2003) "Bayesian Assessment of Favorability for Oil and Gas Prospects over the Reconcavo Basin, Brazil," AAPG Bulletin, Apr. 2003 v. 87 No. 4 pp. 647-666.

* cited by examiner

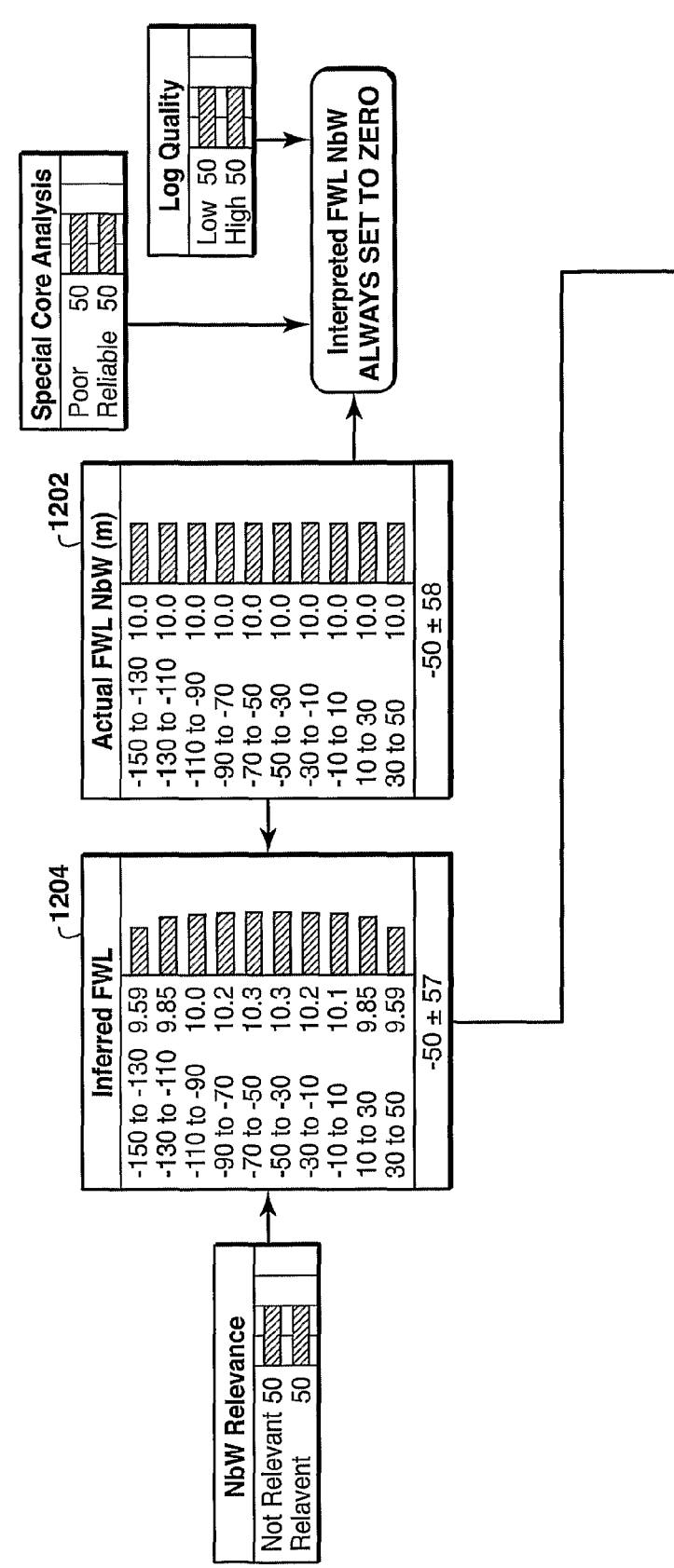

Node: Fracturing ▼

Chance ▼

| ProxPennFault Actual Facies | | Absent | Light | Moderate | Intense |
|---|---|---|---|---|---|
| 0 - 1320 | Grainstone/Packstone | 0.000 | 40.000 | 40.000 | 20.000 |
| 0 - 1320 | Wackstone/Mudstone | 0.000 | 20.000 | 50.000 | 30.000 |
| 1320 - 2640 | Grainstone/Packstone | 5.000 | 50.000 | 30.000 | 15.000 |
| 1320 - 2640 | Wackstone/Mudstone | 0.000 | 40.000 | 40.000 | 20.000 |
| 2640 - 3960 | Grainstone/Packstone | 15.000 | 60.000 | 20.000 | 5.000 |
| 2640 - 3960 | Wackstone/Mudstone | 5.000 | 60.000 | 30.000 | 5.000 |
| 3960 - 5280 | Grainstone/Packstone | 45.000 | 45.000 | 10.000 | 0.000 |
| 3960 - 5280 | Wackstone/Mudstone | 25.000 | 60.000 | 15.000 | 0.000 |
| > 5280 | Grainstone/Packstone | 100.00 | 0.000 | 0.000 | 0.000 |
| > 5280 | Wackstone/Mudstone | 100.00 | 0.000 | 0.000 | 0.000 |

[Apply] [Okay]
[Load] [Close]

*FIG. 14*

```
MODEL
{
  for (g in 1:Ng)
  {
    # Age equation, rearranged (in millions of years)
    Ns.expected[g] <- Ni.expected[g] * (exp(Pop.age * 1.0E6*Lambda.alpha) - 1.) / (Const * Zeta)

# uninformative prior for induced counts
    Ni.expected[g] ~ dunif(0.0, 1000)

#counts are Poisson distributed with unkown mean
    Ns.observed[g] ~ dpois(Ns.expected[g])
    Ni.observed[g] ~ dpois(Ni.expected[g])
  }

Zeta ~ dnorm(Zeta.mean, Zeta.tol)

# uninformative prior for age of the grain population
  Pop.age ~ dunif(0.0, 1000)

# constants
  Aeta.tol <- pow(Zeta.err, -2.0)
  Zeta.err <-2.9
  Zeta.mean <- 113.8
  Const <- Lambda.alpha * Geom.factor * Fluence
  Geom.factor <- 0.5
  Lambda.alpha <- 1.55123E-10
}
```

*FIG. 15*

BAYESIAN NETWORK TRIADS FOR GEOLOGIC AND GEOPHYSICAL APPLICATIONS

This application is the National Stage of International Application No. PCT/US2005/018978, filed 31 May 2005, which claims the benefit of U.S. Provisional Patent Application No. 60/586,027 filed on Jul. 7, 2004.

BACKGROUND

Bayesian networks are a tool for modeling systems. A description of Bayesian networks is provided in U.S. Pat. No. 6,408,290, which description is provided below, with omissions indicated by ellipses. FIG. 1 from the U.S. Pat. No. 6,408,290 patent is replicated as FIG. 1 hereto:

A Bayesian network is a representation of the probabilistic relationships among distinctions about the world. Each distinction, sometimes called a variable, can take on one of a mutually exclusive and exhaustive set of possible states. A Baybsian network is expressed as an acyclic-directed graph where the variables correspond to nodes and the relationships between the nodes correspond to arcs. FIG. 1 depicts an exemplary Bayesian network 101. In FIG. 1 there are three variables, $X_1$, $X_2$, and $X_3$, which are represented by nodes 102, 106 and 110, respectively. This Bayesian network contains two arcs 104 and 108. Associated with each variable in a Bayesian network is a set of probability distributions. Using conditional probability notation, the set of probability distributions for a variable can be denoted by $p(x_i|\Pi_i, \zeta)$ where "p" refers to the probability distribution, where "$\Pi_i$" denotes the parents of variable $X_i$ and where "$\zeta$" denotes the knowledge of the expert. The Greek letter "$\zeta$" indicates that the Bayesian network reflects the knowledge of an expert in a given field. Thus, this expression reads as follows: the probability distribution for variable $X_i$ given the parents of $X_i$ and the knowledge of the expert. For example, $X_1$ is the parent of $X_2$. The probability distributions specify the strength of the relationships between variables. For instance, if $X_1$ has two states (true and false), then associated with $X_1$ is a single probability distribution $p(x_i|\zeta)$ and associated with $X_2$ are two probability distributions $p(x_i|x_1=t,\zeta)$ and $p(x_i|x_1=f, \zeta)$. . . .

The arcs in a Bayesian network convey dependence between nodes. When there is an arc between two nodes, the probability distribution of the first node depends upon the value of the second node when the direction of the arc points from the second node to the first node. For example, node 106 depends upon node 102. Therefore, nodes 102 and 106 are said to be conditionally dependent. Missing arcs in a Bayesian network convey conditional independencies. For example, node 102 and node 110 are conditionally independent given node 106. However, two variables indirectly connected through intermediate variables are conditionally dependent given lack of knowledge of the values ("states") of the intermediate variables. Therefore, if the value for node 106 is known, node 102 and node 110 are conditionally dependent.

In other words, sets of variables X and Y are said to be conditionally independent, given a set of variables Z, if the probability distribution for X given Z does not depend on Y. If Z is empty, however, X and Y are said to be "independent" as opposed to conditionally independent. If X and Y are not conditionally independent, given Z, then X and Y are said to be conditionally dependent given Z.

The variables used for each node may be of different types. Specifically, variables may be of two types: discrete or continuous. A discrete variable is a variable that has a finite or countable number of states, whereas a continuous variable is a variable that has an uncountably infinite number of states. . . . An example of a discrete variable is a Boolean variable. Such a variable can assume only one of two states: "true" or "false." An example of a continuous variable is a variable that may assume any real value between −1 and 1. Discrete variables have an associated probability distribution. Continuous variables, however, have an associated probability density function ("density"). Where an event is a set of possible outcomes, the density p(x) for a variable "x" and events "a" and "b" is defined as:

$$p(x) = \lim_{a \to b}\left[\frac{p(a \leq x \leq b)}{|(a-b)|}\right]$$

where $p(a \leq x \leq b)$ is the probability that x lies between a and b.

Bayesian networks also make use of Bayes Rule, which states:

$$p(B|A) = \frac{p(B) \cdot p(A|B)}{p(A)}$$

for two variables, where p(B|A) is sometimes called an a posteriori probability. Similar equations have been derived for more than two variables. The set of all variables associated with a system is known as the domain.

Building a network with the nodes related by Bayes Rule allows changes in the value of variables associated with a particular node to ripple through the probabilities in the network. For example, referring to FIG. 1, assuming that $X_1$, $X_2$ and $X_3$ have probability distributions and that each of the probability distributions is related by Bayes Rule to those to which it is connected by arcs, then a change to the probability distribution of $X_2$ may cause a change in the probability distribution of $X_1$ (through induction) and $X_3$ (through deduction). Those mechanisms also establish a full joint probability of all domain variables (i.e. $X_1$, $X_2$, $X_3$) while allowing the data associated with each variable to be uncertain.

Software available from several vendors, including Norsys Software Corp., allows construction of Bayesian networks with many interrelated nodes, with each node capable of having many states. Bayesian networks may be used to construct Bayesian Belief Networks and Bayesian Decision Networks.

As mentioned above, Bayesian networks have been used to model physical systems. In some cases, models of physical systems are based on observed data. Frequently, such data has a quality, or reliability, parameter associated with it that reflects the amount of confidence an observer has in the observed data.

SUMMARY

In general, in one aspect, the invention features a method for modeling a system to estimate values and associated uncertainties for a first set of variables describing the system. The method includes selecting a second set of system variables, where the second set is directly or indirectly causally related to the first set of variables. The method further includes obtaining or estimating data for each variable in the second set and appraising the quality of selected data. The method further includes forming a network with nodes including both sets of variables and the quality appraisals, having directional links connecting interdependent nodes, the directional links honoring known causality relationships. The method further includes using a Bayesian Network algorithm with the data and quality information to solve the network for the first set of variables and their associated uncertainties.

Implementations of the invention may include one or more of the following. At least one of the second set of system variables may represent observed values of one of the first set of variables. Network forming may include forming one or more risking triads. Each risking triad may include a first node representing an observed value of one of the first set of variables, a second node representing an actual value of the variable of the first node, and a third node representing the quality of the observed value of the variable of the first node. Each of the second and third nodes may be connected to the first node by a link indicating that the second and third nodes cause the first node.

Risking triad forming may include forming the risking triad such that the second node represents a probability distribution of the actual values of the variables of the first node. Risking triad forming may include forming the risking triad such that the third node represents a probability distribution of the quality of the observed values of the variables of the first node. Risking triad forming may includes forming the risking triad such that the first node represents a probability distribution of the observed values of the variables of the first node. Risking triad forming may include forming the risking triad such that the second node represents a probability distribution of the actual values of the variables of the first node, the third node represents a probability distribution of the quality of the observed values of the variables of the first node, the first node represents a probability distribution of the observed values of the variables of the first node, and the probability distribution of the first node is related to the probability distribution of the second node and the probability distribution of the third node by Bayes Rule. Risking triad forming may include forming the risking triad such that the probability distribution of the first node has a dimension related to the probability distribution of the second node and the probability distribution of the first node has a dimension related to the probability distribution of the third node. Risking triad forming may include forming the risking triad such that the probability distribution of the first node is a discrete probability distribution, the probability distribution of the second node is a discrete probability distribution, and the probability distribution of the third node is a discrete probability distribution. Risking triad forming may include forming the risking triad such that the variable of the first node has states, the states are mutually exclusive, and the states are exhaustive.

The system may have a behavior and the method may further include selecting the first set of variables and the second set of variables so that together they are sufficiently complete to account for the behavior of the system. None of the data may be selected for quality appraisal.

The system to be modeled may be a system governing sand composition and sand texture. The first set of variables includes sand composition and sand texture. The second set of variables may include hinterland geology, hinterland weathering and transport, and basin transport and deposition.

The system to be modeled may be a system governing reservoir quality. The first set of variables may include reservoir quality and the second set of variables may include compositional control, over-pressure effect, burial depth, compaction, mean grain size, early clay coating, active surface area, max. temperature, time at max. T, cementation, sorting, matrix proportion, and initial RQ.

The system to be modeled may be a system necessary to identify seismic bright spots. The first set of variables may include seismic tuning, net, gross, pore fluid, and the second set of variables may include kerogen type, maturation, charge, trap, seal, deposition model, seismic resolution, seismic amplitude response, net/gross, and reservoir thickness.

The system to be modeled may be a system governing carbonate cement in clastic reservoirs. The first set of variables may include calcite cement susceptibility and local calcite volume and The second set of variables may includes depositional environment, aridity while exposed, systems tract, reactive calcite, initial $CaCO_3$, Ca-rich volcanics, plagioclases, additional cement, flow properties, sequence setting, and concretions.

The system to be modeled may be the system governing direct-hydrocarbon-indicator-based drilling decisions. The first set of variables may include do-full-DHI-analysis (decision) and drill (decision) and the second set of variables may include cost-of-full-DHI-analysis (utility), cost to drill (utility), hydrocarbons present, prelim. DHI indicates hydrocarbons, and full-study DHI indicates hydrocarbons.

In general, in another aspect, the invention features a Bayesian Network. The Bayesian Network includes a first node representing observed values of a variable, a second node representing an actual value of the variable, and a third node representing a quality of the observed value of the variable. The second and third nodes are each connected to the first node by a link indicating that the second and third nodes cause the first node.

In general, in another aspect, the invention features a method for constructing a Bayesian Network. The method includes creating a first node representing an observed value of a first variable, creating a second node representing an actual value of the variable, and creating a third node representing the quality of the observed value of the variable. The second and third nodes are each connected to the first node by a link indicating that the second and third nodes cause the first node.

BRIEF DESCRIPTION OF THE DRAWINGS

FIG. 14 is an example of a multi-dimensional probability distribution with data filled in by an expert.

FIG. 15 illustrates code to implement a Bayesian network.

DETAILED DESCRIPTION

While the technology described herein is applicable to numerous industries, the description will focus on modeling for the petroleum industry. The upstream petroleum industry uses uncertain data from a complex domain to generate best-estimate predictions with correct associated uncertainties. The scientist, engineer, or economist dealing with such data may have a good idea how the domain functions. That is, they may know that if variable A changes, it will cause a change in variable B by a predictable amount, with greater or lesser certainty. This domain knowledge may be available for all critical variables in the domain, allowing the causal links between them to be defined. This form of information can be exploited, for example, in the prediction process, as well as in sensitivity analyses and in determining the value of information. Bayesian networks cast this causal domain information, along with any training data or observations, in a computational framework. Such networks may be used to make rigorous predictions of the values of geologic, economic, and engineering variables with associated uncertainties in order to provide more comprehensive information to the upstream-geoscience decision-making process. It is useful to model the joint probability of all domain variables to accommodate uncertainty analyses, sensitivity analyses, and tolerance to missing data or data with uncertainties can be accommodated.

The Bayesian networks described herein honor known causal relationships between nodes when establishing dependencies between nodes. When causal relationships are properly modeled, independence/dependence relationships are correctly modeled, a property of Bayesian networks known as "d-separations." Analysis of the Bayesian network produces the full joint probability of all domain variables and the data, which may be uncertain to varying levels. Thus, the Bayesian network represents knowledge of the domain. Further, Bayesian networks model the domain directly, rather than just, for example, the consequences of the domain, or how the expert reasons from domain information.

One such causal relationship between nodes that may be included in the Bayesian networks described herein is a "risking triad" that incorporates the quality, or reliability, of observed data into the model.

Figure 1:
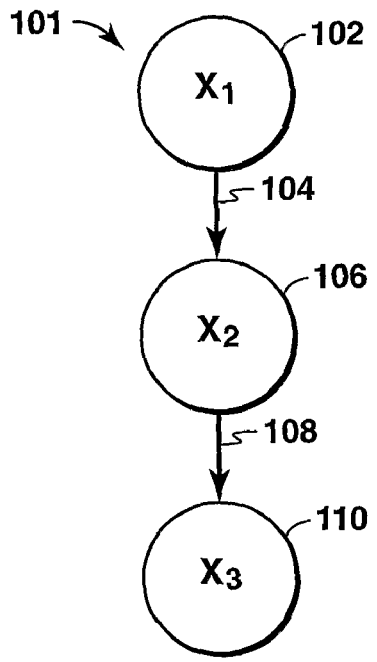
FIGS. 1-3 are representations of logically correct and causal probabilistic relationships in a Bayesian network.
Figure 2:
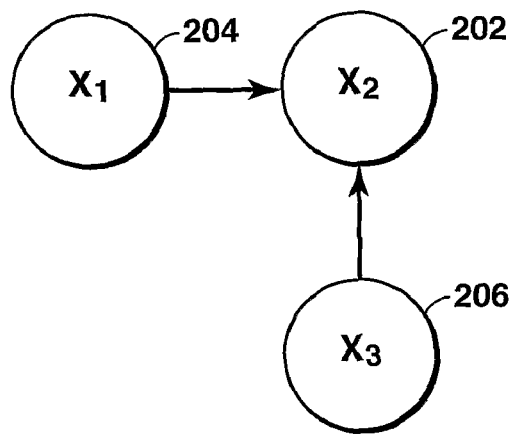
Figure 3:
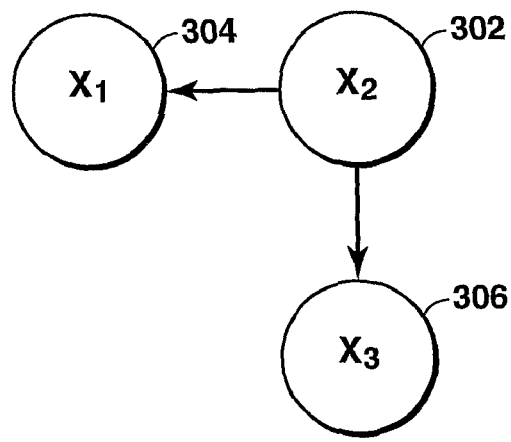

Logically correct and causal probabilistic relationships in a Bayesian network may be modeled by three 3-node relationships, as illustrated in FIGS. 1-3. The converging-arcs arrangement, shown in FIG. 2, which is also known as the "explaining-away" arrangement, constitutes the first possibility. In the example shown, node 202 depends on node 204 and node 206. An adjustment to the probability distribution of node 204 may result in a change in the probability distribution of nodes 202 and 206. If such an adjustment causes the probability associated with node 204 to be reduced, the effect is that node 204 has been "explained away" relative to node 202.

The other two logically correct and causal methods of connecting three nodes illustrate "conditional independence." The first is a linear arrangement as shown in FIG. 1. In this arrangement, if the value of the central node (node 106) is known without uncertainty, then the two other nodes (nodes 102 and 110) may vary independently of one another. That is, knowing something about one of the two nodes (nodes 102 and 110) does not add any information about the other.

FIG. 3 illustrates another conditional independence modeling arrangement where the connections are diverging. As before, if the value of the central node (node 302) is known with certainty, then the two other nodes (nodes 304 and 306) behave independently.

Figure 4:
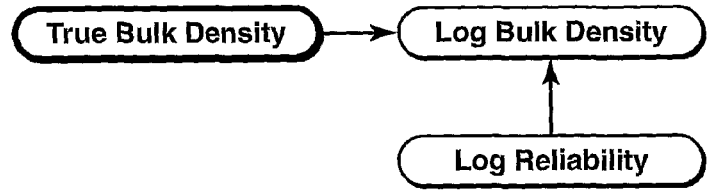
FIGS. 4-6 are representations of particular applications of logically correct and causal probabilistic relationships in a Bayesian network.
Figure 5:
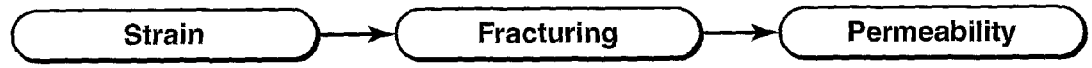
Figure 6:

FIGS. 4, 5 and 6 illustrate petroleum geoscience examples of these node arrangements. FIG. 4 depicts reasoning from an analysis of a density log run on a well. "True Bulk Density" is the actual bulk density of the rock and fluids surrounding the location of the measurement; "Log Bulk Density" is the reading given by, or interpretation from, the logging instrument; and "Log Reliability" describes the uncertainty in any value obtained from the instrument. In this example, the Log Bulk Density that the instrument yields depends on the true value (the "True Bulk Density") and the reliability of the instrument (the "Log Reliability").

FIG. 5 illustrates a linear arrangement for predicting rock permeability. One direct cause of increased permeability is the presence of fractures in the rock. A root cause of permeability is the strain the rocks have experienced. Conditional independence is manifest by the fact that if we know the state of fracturing of the rock, knowledge about the strain adds no further information about the state of permeability of the rock.

FIG. 6 illustrates a diverging arrangement for predicting drilling cost and the fluid type in the reservoir (oil, gas, water). Conditional independence is manifest by the fact that if we know the reservoir depth, knowing the state of either of the other variables adds no further information about the remaining one.

Figure 7:
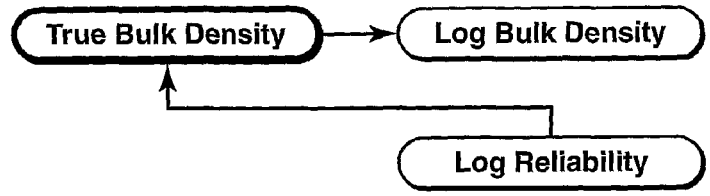
FIG. 7 is a representation of a non-causal probabilistic relationship in a Bayesian network.

FIG. 7 shows a non-causal network that illustrates how some Geoscientist might address the problem illustrated in FIG. 4. The reasoning might be as follows: "Given an instrument value for density and the instrument reliability, what do I deduce about the state of nature?" This approach is contrary to that shown in FIG. 4. In FIG. 4, the analysis is properly causal, in that the Log Bulk Density depends on the True Bulk Density and the Log Reliability. That is, the observed value of bulk density depends on the actual value of bulk density and the quality, or reliability, of the observation. In contrast, in FIG. 7, the analysis is non-causal because the actual value of bulk density depends on the observed value of bulk density and the quality of the observation, while in nature the actual value does not depend on the observed value or the observation quality.

Only coincidentally would the arrangement shown in FIG. 7 produce a correct numerical value for the most probable state and a correct quantification of the associated uncertainty. That is, the arrangements in FIGS. 4 and 7 are topologically different and cannot, in general, be made to produce the same results for all states of the nodes.

Strict causal constructs may not always be possible, and therefore alternative constructs may be used on occasion. For instance, Jensen, F. V, *An Introduction to Bayesian Networks* (Springer-Verlag, N.Y. 1996), provides a method for implementing correlations among variables.

In the techniques described herein, no links point contrary to known causality.

Figure 8:
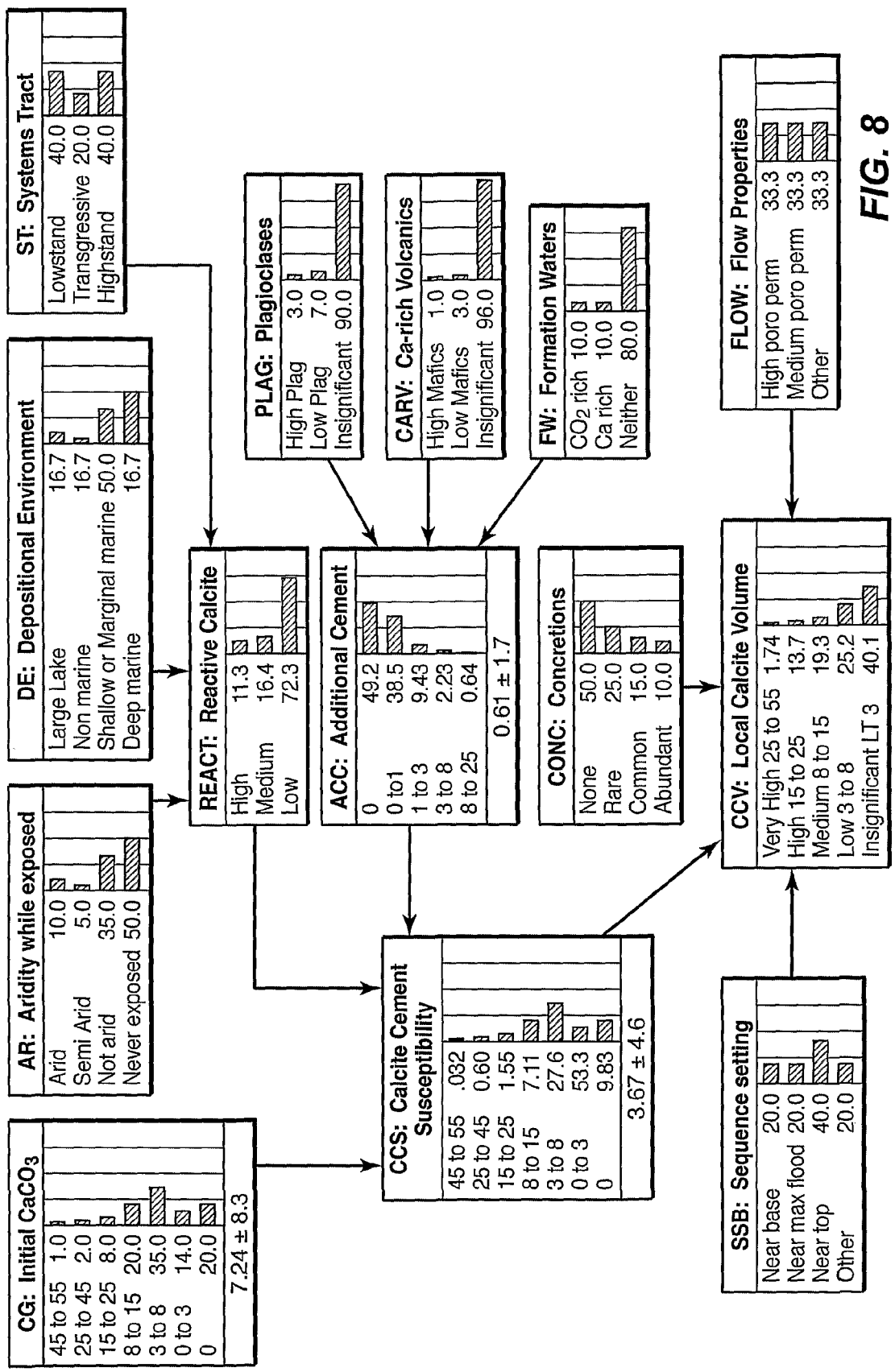
FIG. 8 is a representation of a Bayesian network constructed with linear conditional-independence relationships between the nodes.

An example of a Bayesian network constructed with linear conditional-independence relationships between the nodes, shown in FIG. 8, may be used to predict the amount of calcite being introduced into a clastic reservoir rock (which, if great enough, would cause precipitation of a calcite cement and occlusion of reservoir porosity). The illustration was generated using the NETICA product available from Norsys Software Corp. Each of the boxes in FIG. 8 represents a node of the Bayesian network. The phrase at the top of each box (e.g., "CG: Initial CaCO3") is the name of the variable associated with that node. The list below the name in each box is the list of possible states for the associated variable and the probability of that state. For example, the probability that the value of the Initial CaCO3 variable is between 45 and 55 is 1 percent. A most-likely value is included at the bottom of the box, where such a value can be computed. For example, the most likely value of Initial CaCO3 is 7.24±8.3. The possibility of a negative percentage of calcite is an artifact of the modeling engine.

Figure 9:
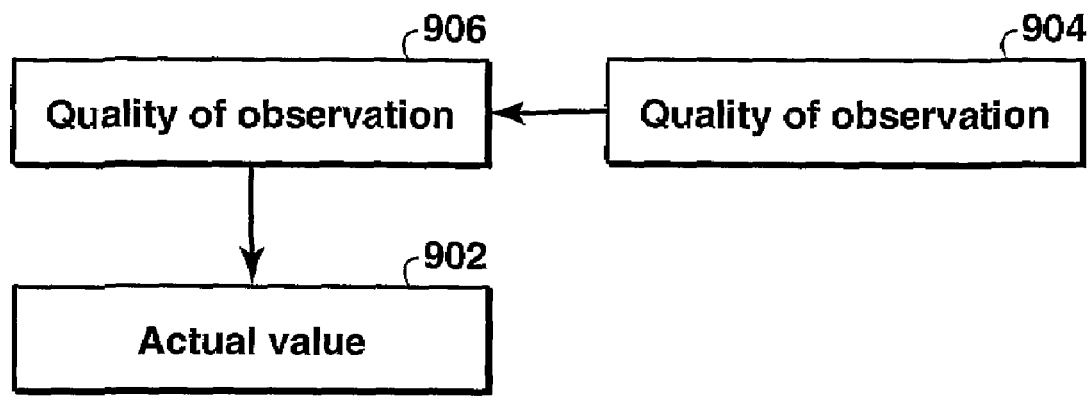
FIG. 9 is a representation of a risking triad.

FIG. 4 is an illustration of an arrangement of Bayesian network nodes that embody the following concept: what exists in nature (True Bulk Density) and the ability of our technology to reveal what exists in nature (Log Reliability) combine to determine what we actually observe with our technology (Log Bulk Density). An arrangement of Bayesian network nodes to embody this concept generally, which may be called a "risking triad," is illustrated in FIG. 9. The actual value (node 902) and the quality, or reliability, of the observation (node 904) combine to reveal the observed value (node 906). The risking triad incorporates the quality, or reliability, of an observation to improve the prediction of what exists in nature. Incorporating risking triads into a Bayesian network where quality of the data may be an issue will likely improve the quality of the model represented by the Bayesian network.

Figure 10:
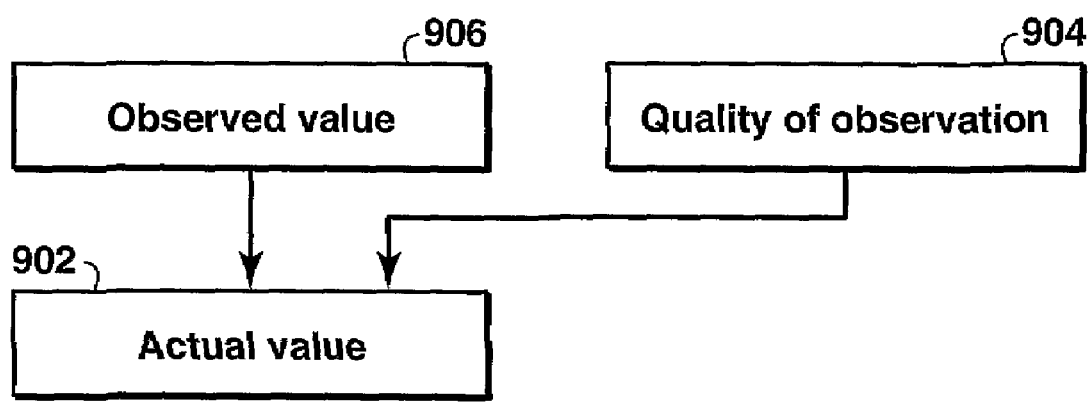
FIG. 10 is a representation of a non-causal triad of nodes.

FIG. 10 illustrates a generalization of the arrangement of Bayesian network nodes illustrated in FIG. 7. In FIG. 10, the observed value (node 906) and the quality of the observation (node 904) combine to predict the actual value (node 902).

Figure 11:
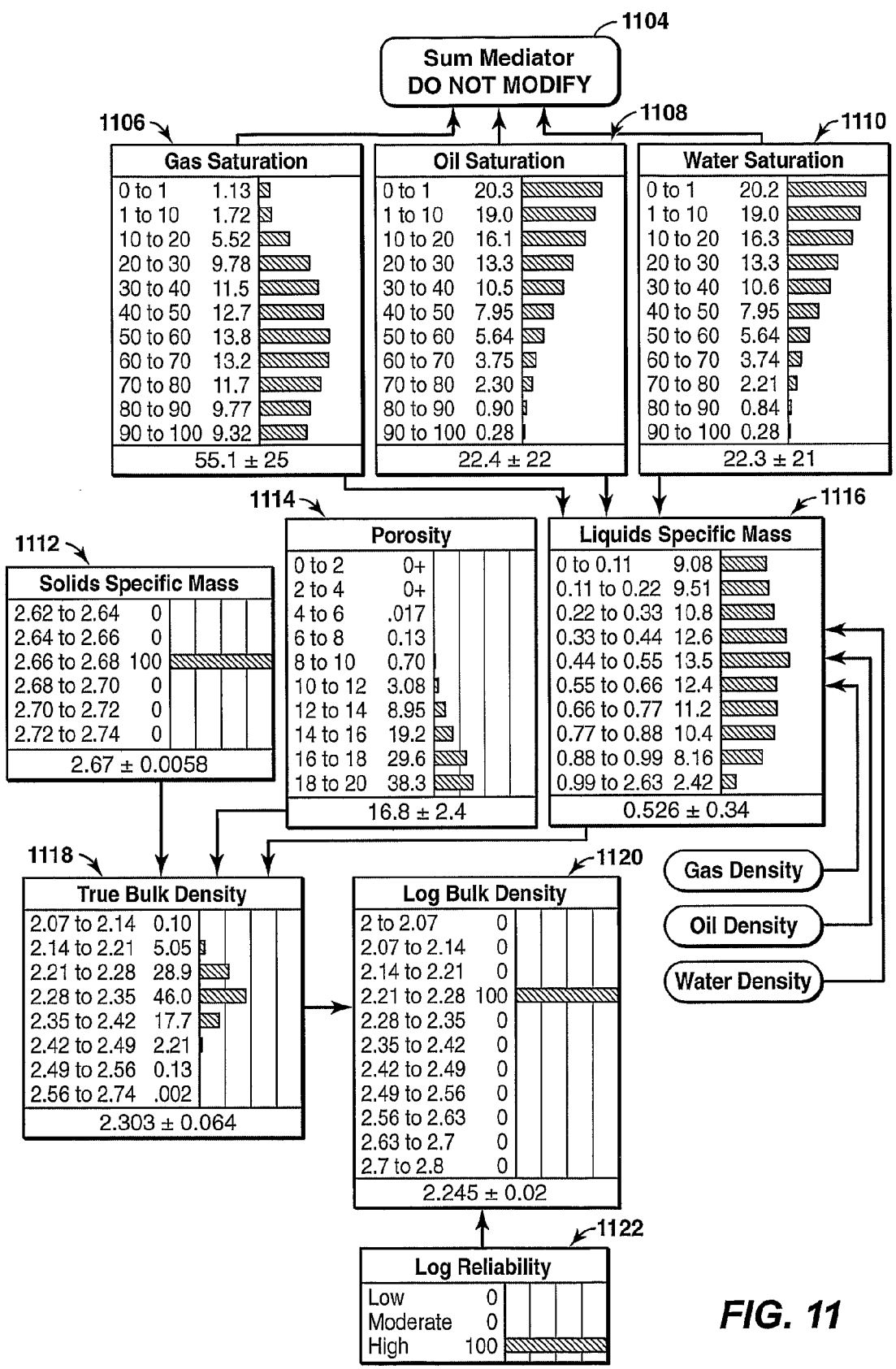
FIGS. 11-13 illustrate Bayesian networks with risking triads.
Figure 12B:
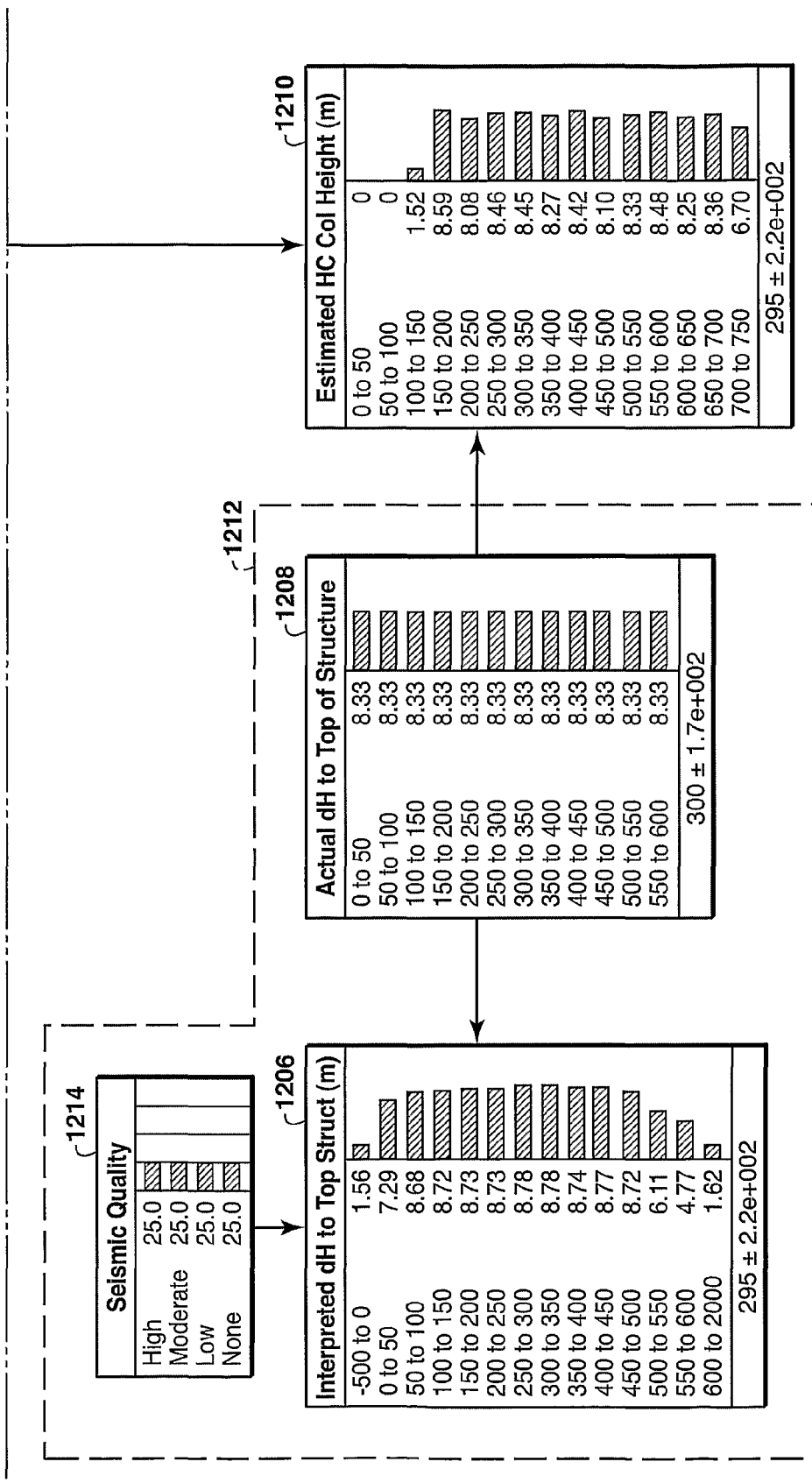
Figure 13A:
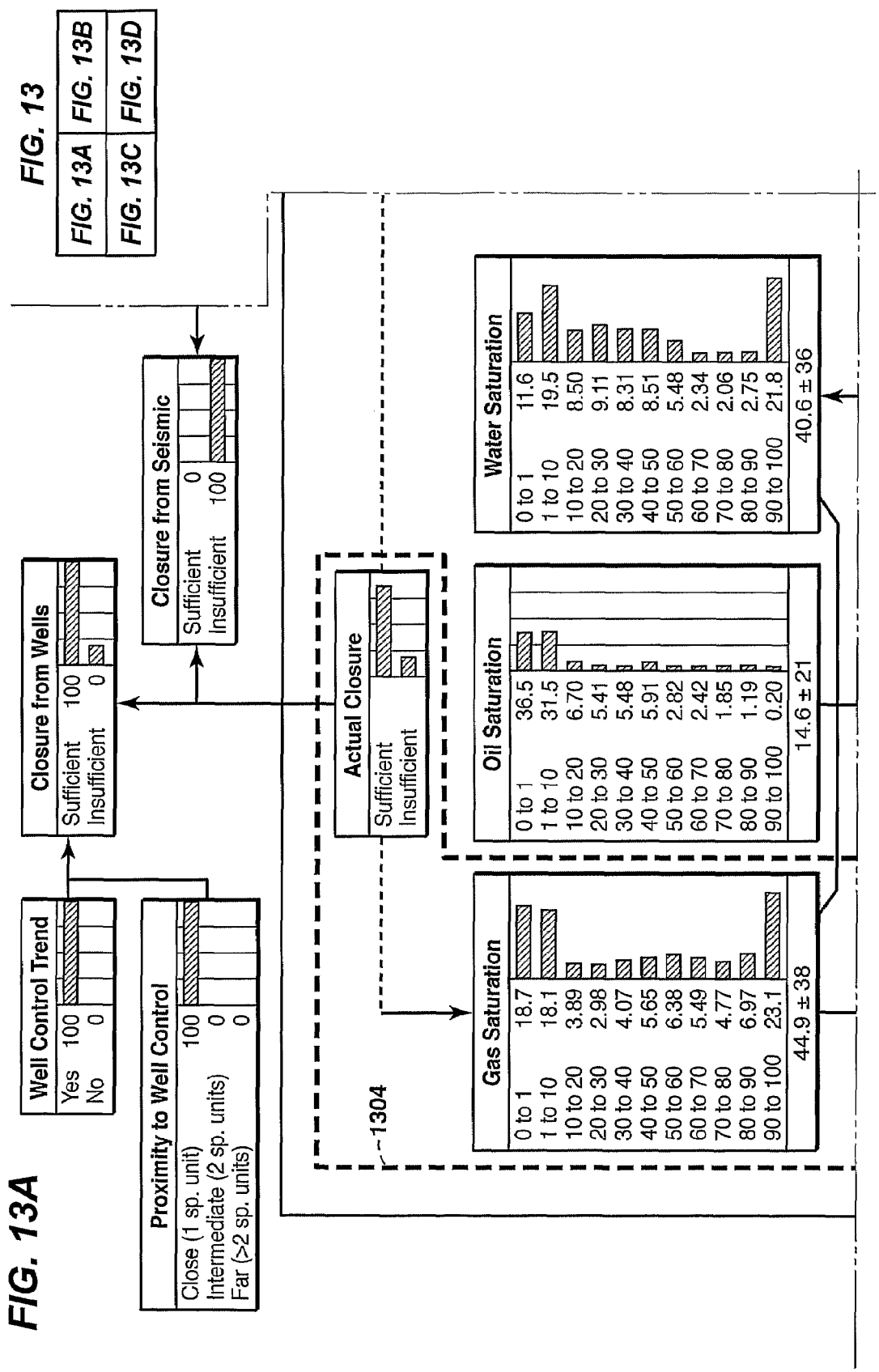
Figure 13B:
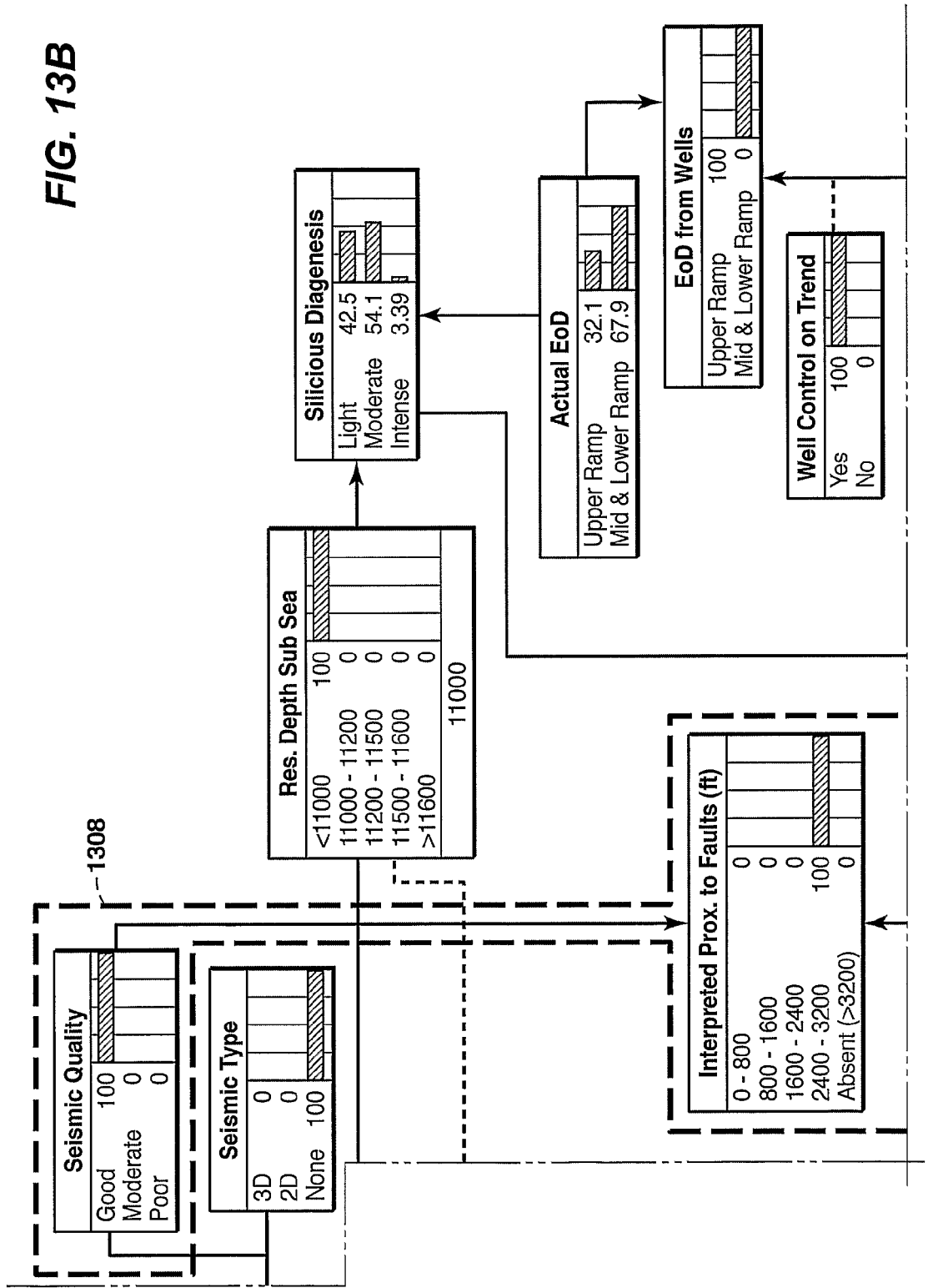
Figure 13C:
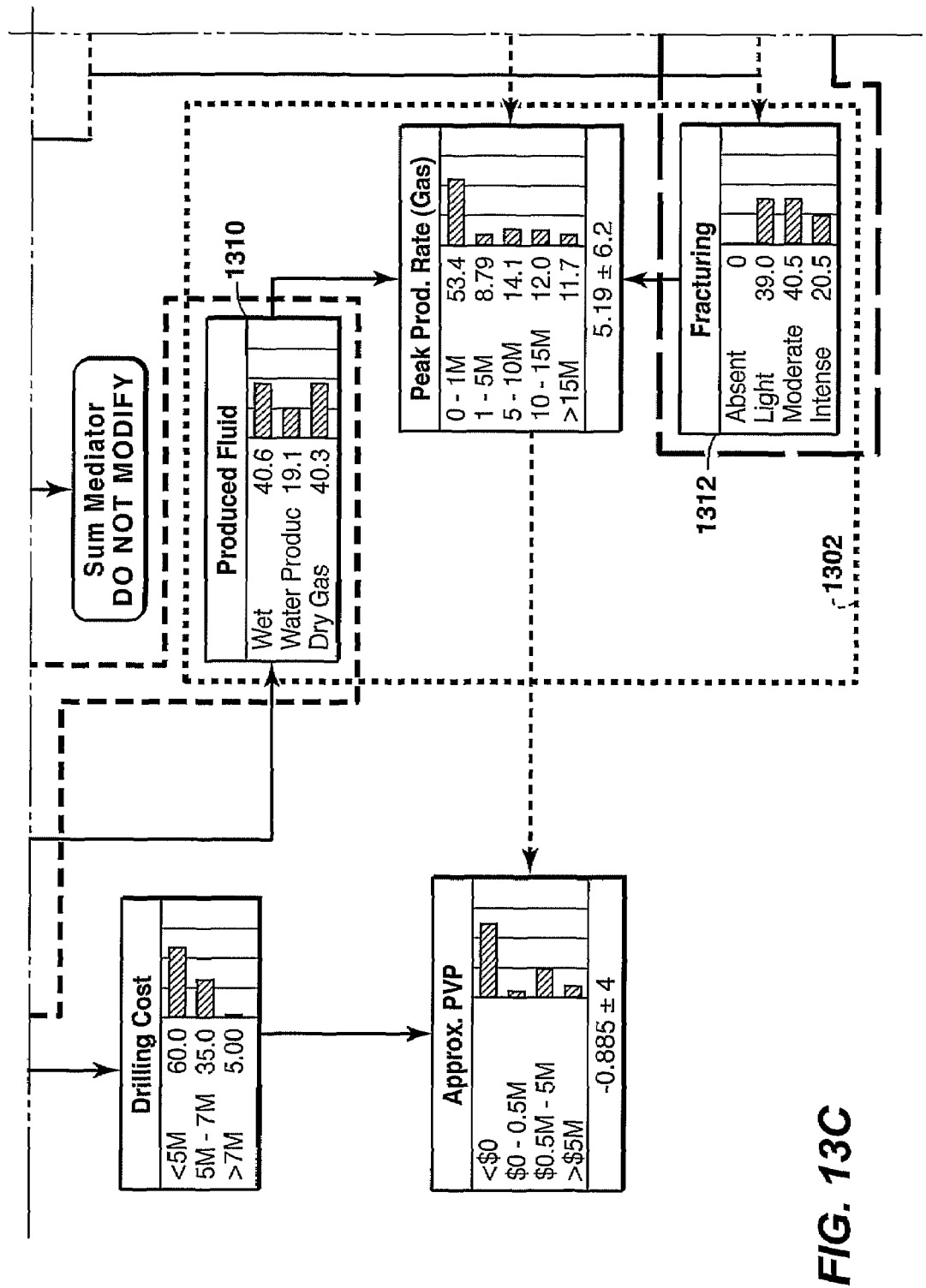
Figure 13D:
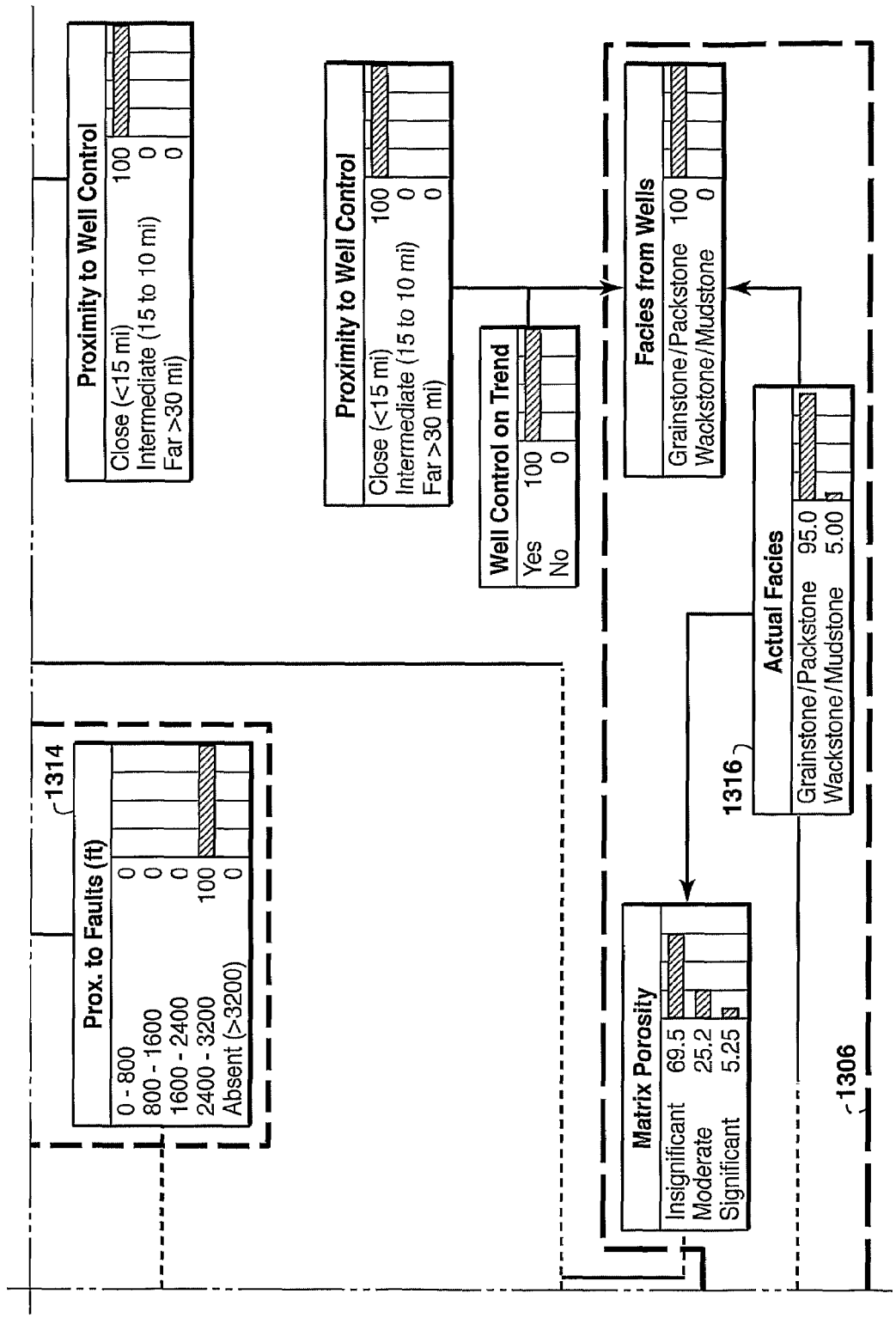

FIGS. 11, 12 and 13 illustrate Bayesian networks with risking triads. The Bayesian network fragment in FIG. 11 might be used to predict porosity and the composition of the pore-filling "fluid" from a density log. A risking triad 1118→1120←1122 is included in the network.

FIG. 11 also illustrates the ability of a Bayesian network to honor physical constraints. The network fragment shown in the figure predicts the content of a reservoir (water, gas, oil). For this example, the sum of the values for the three component must equal one. The node 1104 labeled "Sum Mediator Do Not Modify" enforces this sum, within a tolerance of, for example, +/−1%. It does so by being permanently set to true, with probabilities for true being nonzero only when the sum of the three components is, in fact, close to 100%.

The Bayesian network illustrated in FIG. 12 illustrates determining a delta height from a datum that has uncertainty. Specifically, it applies to measuring the possible height of a hydrocarbon column above the free-water level (FWL), as estimated from a nearby well (NbW) using two imperfect petrophysical methods. The interpreted FWL in the NbW is always specified as at datum (zero), but the uncertainty propagates to the actual FWL in the node 1202 to its left. The model convolves the recorded understanding of the similarity of the NbW to the new well we will drill to estimate the FWL at that new well site (Inferred FWL 1204). The top of the structure (measured as a delta relative to the estimated FWL) is considered imperfectly imaged by seismic (left-bottom node 1206), which leads to uncertainty in the actual delta height of the structure. The FWL 1204 and the delta height of the structure from the FWL 1208, combine to yield the probability distribution for the hydrocarbon column height shown (lower-right node 1210). The Bayesian network includes a risking triad 1212, which includes nodes 1206, 1208 and 1214. The illustrated values and uncertainty distributions are fictitious.

FIG. 13 illustrates a Bayesian network that yields the probability of successfully producing hydrocarbons and making a profit from that production. The variables are selected for a specific play, not a general model. This example uses all three types of node arrangements: "explaining-away" arrangements, e.g. 1302, linear arrangements, e.g. 1304, and divergent arrangements, e.g. 1306. It also includes risking triads, e.g. 1308.

FIG. 13 illustrates another concept: any single node simultaneously may be a part of more than one arrangement of nodes. For example, node 1310 is part of an "explaining-away" arrangement 1302 and a linear arrangement 1304. Similarly, node 1312 is part of the "explaining-away" arrangement 1302 and the divergent arrangement 1306.

The probability distribution for the fracturing node 1312, illustrated in FIG. 14, has two dimensions, one from each of its parent nodes (nodes 1314 (ProxPennFault, or Proximity to Pennsylvanian Age Faults) and 1316 (Actual Facies)), and four states (absent, light, moderate, and intense). In the example shown, the values in the table were supplied by an expert in the field.

FIG. 15 illustrates code to fit the standard age equation of fission-track data using the Bayesian paradigm. Each variable constitutes a node, similar to the graphical view of a network in FIG. 5, but, rather than having states, this algorithm samples for specified distribution functions. This model for determining sample age from a suite of grain ages uses the causal relationships that the actual sample age and natural variability in radio-chemistry of the grains causes to the observed variety of apparent grain ages. The code in FIG. 15 is in the format used by the BUGS or WinBUGS solution engines (BUGS: Medical Research Council (MRC); WinBUGS: Imperial College & MRC, UK), which uses a Gibbs Monte Carlo Markov Chain algorithm (or Metropolis-within-Gibbs algorithm, or similar) to find the domain joint probability distribution.

Figure 16:
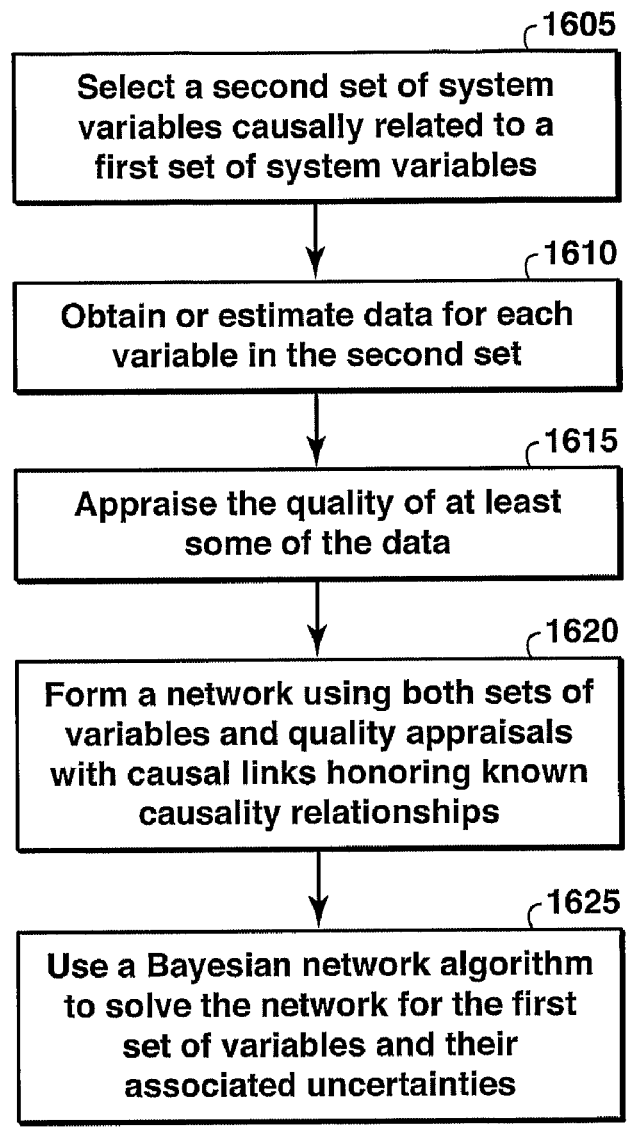
FIG. 16 is a flow chart illustrating the creation of a Bayesian network.

An example method for building a Bayesian network for use in modeling systems, illustrated in FIG. 16, begins by selecting a first set of system variables. These variables should include properties of the system that one wishes to estimate or predict. For example, in FIG. 11, the first set of system variables may include gas saturation 1106, oil saturation 1108, water saturation 1110, solids specific mass 1112, porosity 1114, liquids specific mass 1116, and true bulk density 1118.

The method then selects a second set of system variables causally related to the first set of system variables (block 1605). In FIG. 11, the second set of system variables includes log bulk density 1120. In the example shown in FIG. 11, the log bulk density has been interpreted to be between 2.1 and 2.28.

The two sets of system variables are chosen so that, when combined, they are sufficiently complete to substantially account for the behavior of the system, i.e., to generate a prediction that is useful for the intended purpose. There is, however, some discretion involved in the placement of a particular variable in the first set or the second set. For example, any of the nodes identified above as being in the first set of system variables, including, for example, the solids specific mass node 1112, could be placed in the second set of system variables rather than the first.

The method then obtains or estimates data for each variable in the second set of system variables (block 1610). Data estimation is typically done by an expert in the field. For example, the values under the "Absent," "Light," "Moderate,"

and "Intense" columns in FIG. 14 are estimates of the probability of fracturing given its two inputs (ProxPennFault and Actual Facies).

The method then appraises the quality, or reliability, of at least some of the data (block 1615). In FIG. 11, block 1122 illustrates the appraisal of the quality of the log bulk density data. Appraising the quality of at least some of the data is an optional part of the method. For data for which quality is an issue, an appraisal of that quality will tend to improve the quality of the model represented by the Bayesian network. FIG. 8 illustrates a Bayesian network that does not include an assessment of the quality of any of the data.

The method then forms a network using both sets of variables and quality appraisals with causal links honoring known causality relationships (block 1620). This is illustrated in FIG. 11, with each of the first and second set of system variables and the quality appraisal being assigned to nodes in the network. The causal relationships between the nodes and the network are indicated by the arcs between the nodes with the direction of the node indicating causality relationships. For example, true bulk density 1118 and log reliability 1122 are shown to cause log bulk density 1120.

Once the network is built, the method uses a Bayesian network algorithm to solve the network for the first set of variables and their associated uncertainties (block 1625). This is done by, for example, loading the node information into a commercially available software, such as NETICA by Norsys Software Corp. and compiling the network. In FIG. 1 the shaded boxes have been assigned values with 100% certainty. When the network is "compiled," using the terminology adopted by Norsys, the probabilities of the other nodes in the system are revised in accordance with the relationships established between the nodes and the probability distributions defined for each node.

Figure 17:
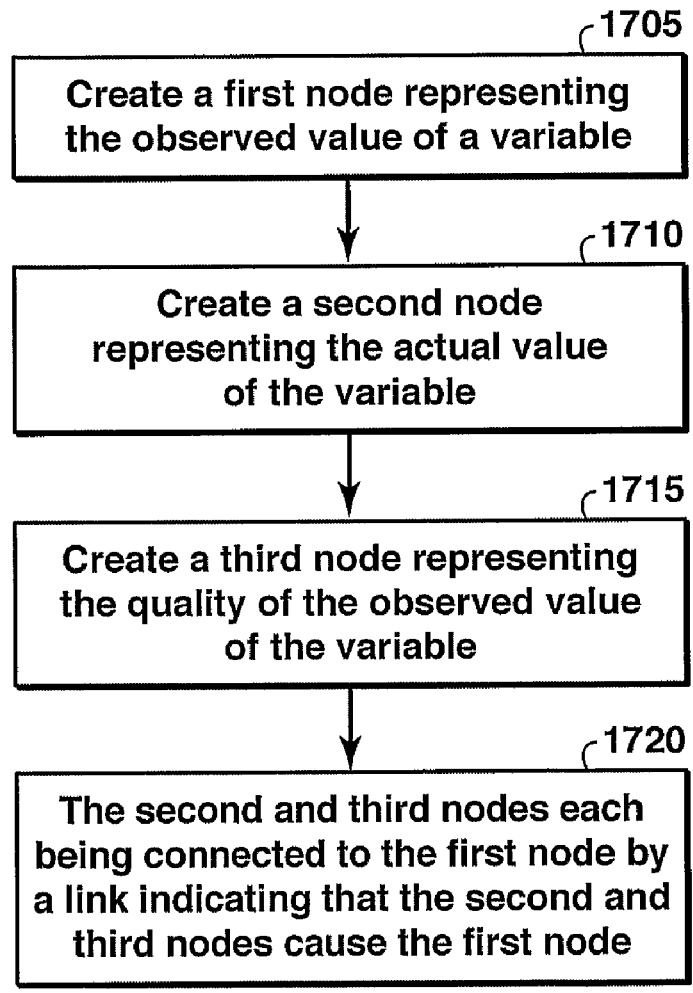
FIG. 17 is a flow chart illustrating the creation of a risking triad.

A risking triad is formed, as shown in FIG. 17, by creating a first node representing the observed value of a variable (block 1705). For example, in FIG. 11, the first node would be the log bulk density node 1120.

The method then creates a second node representing the actual value of the variable (1710). In FIG. 11, the second node is the true bulk density node 1118 which represents the actual bulk density.

The method then creates a third node representing the quality, or reliability, of the observed value of the variable (block 1715). In FIG. 11, the log reliability node 1122 is the third node that represents the quality of the log bulk density 1120.

Finally, the second and third nodes are connected to the first node by links indicating that the second and third nodes cause the first node (block 1720). In FIG. 11, this is indicated by the arcs from the true bulk density node 1118 and log reliability node 1122 to the log bulk density node 1120.

The Bayesian networks described herein can be used for many purposes in many industries. For example, Bayesian networks could be applied in the upstream geosciences sector of the petroleum industry in the following applications:

(a) Prediction of sand composition and sand texture—in this example, the system to be analyzed, or modeled, would be the system governing sand composition and sand texture. In one embodiment of such a system, the first set of variables are Sand Composition and Sand Texture, and the second set of variables are Hinterland Geology, Hinterland Weathering and Transport, and Basin Transport and Deposition.

(b) Prediction of Reservoir Quality—in this example, the system to be analyzed, or modeled, would be the system governing reservoir quality. In one embodiment of such a system, the first set of variables is Reservoir Quality and the second set of variables is Compositional Control, Over-Pressure Effect, Burial Depth, Compaction, Mean Grain Size, Early Clay Coating, Active Surface Area, Max. Temperature, Time at Max. T, Cementation, Sorting, Matrix Proportion, and Initial RQ.

(c) Seismic Bright-Spot Analysis—in this example, the system to be analyzed, or modeled, would be the system necessary to identify seismic bright spots. In one embodiment of such a system, the first set of variables is Seismic Tuning, Net, Gross, and Pore Fluid, and the second set of variables is Kerogen Type, Maturation, Charge, Trap, Seal, Depo. Model, Seismic Resolution, Seismic Amplitude Response, Net/Gross, and Resvr. Thickness.

(d) Predicting Carbonate Cement in Clastic Reservoirs—in this example, the system to be analyzed, or modeled, would the system governing carbonate cement in clastic reservoirs. In one embodiment of such a system, the first set of variables is Calcite Cement Susceptibility and Local Calcite Volume and the second set of variables is Depositional Environment, Aridity while exposed, Systems Tract, Reactive Calcite, Initial CaCO3, Ca-rich Volcanics, Plagioclases, Additional Cement, Flow Properties, Sequence setting, and Concretions.

(e) Direct-Hydrocarbon-Indicator-based drilling decisions—in this example, the system to be analyzed, or modeled, would be the system governing direct-hydrocarbon-indicator-based drilling decisions. In one embodiment of such a system, the first set of variables is Do Full DHI Analysis (Decision) and Drill (Decision) and the second set of variables is Cost of Full DHI Analysis (Utility), Cost to Drill (Utility), Hydrocarbons present, Prelim. DHI Indicates Hydrocarbons, and Full-Study DHI Indicates Hydrocarbons.

In the preceding examples, the system is a petroleum-bearing or potentially petroleum-bearing geological or geophysical system. The particular example systems are physical systems. The invention can also be applied to a man-made system, or a combination man-made and physical system. Examples of man-made systems may be found, without limitation, in the downstream petroleum industry. These applications include modeling of petroleum-engineering systems, asset management, and opportunity capture. Examples of downstream systems that can be modeled by the present inventive method include refining feed and procedures and products, distribution and marketing.

While the present invention has been described with reference to an exemplary embodiment thereof, those skilled in the art will know of various changes in form that may be made without departing from the spirit and scope of the claimed invention as defined in the appended claims. For example, the person skilled in the art will recognize that nodes of marginal impact could be added to the network with little effect on the value of the network even if such nodes have non-causal connections. All such variations will be deemed included in the following claims.

What is claimed is:

1. A method for modeling a geologic or geophysical system to estimate values and associated uncertainties for a first set of geologic or geophysical variables describing said geologic or geophysical system, said method comprising:

selecting a second set of geologic or geophysical system variables, said second set being directly or indirectly causally related to said first set of geologic or geophysical variables, wherein at least one of the second set of geologic or geophysical variables represents observed values of one of the first set of geologic or geophysical variables;

obtaining or estimating data for each geologic or geophysical variable in the second set;

appraising the quality of the geologic or geophysical data from the second set;

forming a network with nodes comprising both sets of geologic or geophysical variables and said quality appraisals, having directional links connecting interdependent nodes, wherein network forming includes forming one or more risking triads, each risking triad having a first node representing an observed value of one of the first set of geologic or geophysical variables, a second node representing an actual value of the variable of the first node, and a third node representing the quality of the observed value of the variable of the first node, each of the second and third nodes each being connected to the first node by a link indicating that the second and third nodes cause the first node; and using a Bayesian Network algorithm with said geologic or geophysical data and quality information to solve the network for said first set of geologic or geophysical variables and their associated uncertainties.

2. The method of claim 1, wherein risking triad forming includes forming the risking triad such that:

the second node represents a probability distribution of the actual values of the variables of the first node.

3. The method of claim 1, wherein risking triad forming includes forming the risking triad such that:

the third node represents a probability distribution of the quality of the observed values of the variables of the first node.

4. The method of claim 1, wherein risking triad forming includes forming the risking triad such that:

the first node represents a probability distribution of the observed values of the variables of the first node.

5. The method of claim 1, wherein risking triad forming includes forming the risking triad such that:

the second node represents a probability distribution of the actual values of the variables of the first node;

the third node represents a probability distribution of the quality of the observed values of the variables of the first node;

the first node represents a probability distribution of the observed values of the variables of the first node; and the probability distribution of the first node is related to the probability distribution of the second node and the probability distribution of the third node by Bayes Rule.

6. The method of claim 5, wherein risking triad forming includes forming the risking triad such that:

the probability distribution of the first node has a dimension related to the probability distribution of the second node; and the probability distribution of the first node has a dimension related to the probability distribution of the third node.

7. The method of claim 5, wherein risking triad forming includes forming the risking triad such that:

the probability distribution of the first node is a discrete probability distribution;

the probability distribution of the second node is a discrete probability distribution; and the probability distribution of the third node is a discrete probability distribution.

8. The method of claim 5 wherein risking triad forming includes forming the risking triad such that:

the variable of the first node has states;

the states are mutually exclusive; and the states are exhaustive.

9. The method of claim 1, where the system has a behavior, the method further comprising:

selecting the first set of variables and the second set of variables so that together they are sufficiently complete to account for the behavior of the system.

10. The method of claim 1 wherein none of the data are selected for quality appraisal.

11. The method of claim 1 wherein:

the geologic or geophysical system to be modeled is a system governing sand composition and sand texture;

the first set of geologic or geophysical variables includes sand composition and sand texture; and the second set of geologic or geophysical variables includes hinterland geology, hinterland weathering and transport, and basin transport and deposition.

12. The method of claim 1 wherein:

the geologic or geophysical system to be modeled is a system governing reservoir quality;

the first set of geologic or geophysical variables includes reservoir quality; and the second set of geologic or geophysical variables includes compositional control, over-pressure effect, burial depth, compaction, mean grain size, early clay coating, active surface area, max. temperature, time at max. T, cementation, sorting, matrix proportion, and initial RQ.

13. The method of claim 1 wherein:

the geologic or geophysical system to be modeled is a system necessary to identify seismic bright spots;

the first set of geologic or geophysical variables includes seismic tuning, net, gross, pore fluid; and the second set of geologic or geophysical variables includes kerogen type, maturation, charge, trap, seal, depo. model, seismic resolution, seismic amplitude response, net/gross, and resvr. thickness.

14. The method of claim 1 wherein:

the geologic or geophysical system to be modeled is a system governing carbonate cement in clastic reservoirs;

the first set of geologic or geophysical variables includes calcite cement susceptibility and local calcite volume; and the second set of geologic or geophysical variables includes depositional environment, aridity while exposed, systems tract, reactive calcite, initial CaCO3, Ca-rich volcanics, plagioclases, additional cement, flow properties, sequence setting, and concretions.

15. The method of claim 1 wherein:

the geologic or geophysical system to be modeled is the system governing direct-hydrocarbon-indicator-based drilling decisions;

the first set of geologic or geophysical variables includes do-full-DHI-analysis (decision) and drill (decision); and the second set of geologic or geophysical variables includes cost-of-full-DHI-analysis (utility), cost to drill (utility), hydrocarbons present, prelim. DHI indicates hydrocarbons, and full-study DHI indicates hydrocarbons.

16. A Bayesian Network representing a geologic or geophysical system, comprising:

a risking triad having a first node representing an observed value of a geologic or geophysical variable, a second node representing an actual value of the geologic or geophysical variable, and a third node representing a reliability of the observed value of the geologic or geophysical variable, said second node being connected to the first node by a link indicating that the second node causes the first node, and the third node being connected to the first node by a link indicating that the third node causes the first node.

17. The Bayesian Network of claim 16, wherein:
the second node represents a probability distribution of the actual value of the variable.

18. The Bayesian Network of claim 16, wherein:
the third node represents a probability distribution of the reliability of the observed value of the variable.

19. The Bayesian Network of claim 16, wherein:
the first node represents a probability distribution of the observed values of the variable.

20. The Bayesian Network of claim 16, wherein:
the second node represents a probability distribution regarding the variable;
the third node represents a probability distribution regarding the reliability of the observed value of the variable;
the first node represents a probability distribution regarding the observed value of the variable; and
the probability distribution of the first node is related to the probability distribution of the second node and the probability distribution of the third node by Bayes Rule.

21. The Bayesian Network of claim 20, wherein:
the probability distribution of the first node has a dimension related to the probability distribution of the second node; and
the probability distribution of the first node has a dimension related to the probability distribution of the third node.

22. The Bayesian Network of claim 20, wherein:
the probability distribution of the first node is a discrete probability distribution;
the probability distribution of the second node is a discrete probability distribution; and
the probability distribution of the third node is a discrete probability distribution.

23. The Bayesian Network of claim 20 wherein:
the variable of the first node has states;
the states are disjoint; and
the states are exhaustive.

24. A method for constructing a Bayesian Network that represents a geologic or geophysical system, comprising:
creating a first node representing an observed value of a first geologic or geophysical variable;
creating a second node representing an actual value of the geologic or geophysical variable;
creating a third node representing a reliability of the observed value of the geologic or geophysical variable; and
establishing a risking triad using the first node, the second node, and the third node such that said second node is connected to the first node by a link indicating that the second node causes the first node, and the third node is connected to the first node by a link indicating that the third node causes the first node.

25. The method of claim 24, wherein creating the second node includes:
identifying a probability distribution of the actual value of the variable.

26. The method of claim 24, wherein creating the third node includes:
identifying a probability distribution of the reliability of the observed value of the variable.

27. The method of claim 24, wherein creating the first node includes:
identifying a probability distribution of the observed value of the variable.

28. The method of claim 24, wherein:
creating the second node includes identifying a probability distribution regarding the actual value of the variable;
creating the third node includes identifying a probability distribution regarding the reliability of the observed value of the variable;
creating the first node includes identifying a probability distribution regarding the observed value of the variable; and
relating by Bayes Rule the probability distribution of the first node to the probability distribution of the second node and the probability distribution of the third node.

29. The method of claim 28, wherein:
identifying the probability distribution of the first node includes identifying a first dimension related to the probability distribution of the second node; and
identifying the probability distribution of the first node includes identifying a second dimension related to the probability distribution of the third node.

30. The method of claim 28, wherein:
identifying the probability distribution of the first node includes identifying a discrete probability distribution for the first node;
identifying the probability distribution of the second node includes identifying a discrete probability distribution for the second node; and
identifying the probability distribution of the third node includes identifying a discrete probability distribution for the third node.

31. The method of claim 28 wherein creating the first node includes:
identifying disjoint and exhaustive states for the variable of the first node.

* * * * *